United States Patent [19]

Morishita et al.

[11] Patent Number: 4,951,515
[45] Date of Patent: Aug. 28, 1990

[54] STARTER WITH PLANET GEAR SPEED REDUCER

[75] Inventors: Akira Morishita; Shuzoo Isozumi, both of Hyogo, Japan

[73] Assignee: Mitsubishi Denki Kabushiki Kaisha, Tokyo, Japan

[21] Appl. No.: 330,858

[22] Filed: Mar. 31, 1989

[30] Foreign Application Priority Data

Apr. 13, 1988 [JP] Japan .................................. 63-50275

[51] Int. Cl.$^5$ ............................................. F02N 15/04
[52] U.S. Cl. ...................................... 74/7 E; 74/7 C; 74/7 A; 74/6
[58] Field of Search .................... 74/6, 7 A, 7 C, 7 E, 74/409, 410, 785; 475/317

[56] References Cited

U.S. PATENT DOCUMENTS

| | | | |
|---|---|---|---|
| 4,494,414 | 1/1985 | Hamano | 74/7 E |
| 4,503,719 | 3/1985 | Hamano | 74/7 E |
| 4,615,227 | 10/1986 | Stockton | 74/7 C |
| 4,635,489 | 1/1987 | Imamura et al. | 74/7 E |
| 4,680,979 | 7/1987 | Morishita et al. | 74/7 E |
| 4,712,451 | 12/1987 | Morishita et al. | 74/7 E |

FOREIGN PATENT DOCUMENTS 62-45081 12/1987 Japan .

Primary Examiner—Leslie A. Braun
Assistant Examiner—Winnie Yip
Attorney, Agent, or Firm—Sughrue, Mion, Zinn, Macpeak & Seas

[57] ABSTRACT

In a starter having a planet gear speed reducer, an impact stress receiving mechanism is made up of components suitable in configuration for mass production including a ring gear having an internal gear engaged with a plurality of planet gears and axially extended ratchet-shaped teeth on the outer wall. A movable cylinder has teeth formed in the inner wall which are engaged with the ratchet-shaped teeth, and a straight spline gear on the outer wall which is engaged with the starter frame. The movable cylinder is axially slidably mounted on the ring gear. A rubber ring is arranged adjacent to the movable cylinder to absorb the force of moving the movable cylinder axially which is formed when impact stress is produced in the power transmission of the starter.

5 Claims, 1 Drawing Sheet

STARTER WITH PLANET GEAR SPEED REDUCER

BACKGROUND OF THE INVENTION

This invention relates to a starter with a planet gear speed reducer, and more particularly to an improvement of a mechanism for receiving the impact stress which may occur in the power transmission mechanism of the starter (hereinafter referred to as "an impact stress receiving mechanism", when applicable).

In a conventional starter with a planet gear speed reducer, the mechanism for receiving the impact stress which may occur in the power transmission mechanism thereof has been disclosed by Japanese Utility Model Application Examined Publication No. 45081/1987. The conventional starter, as shown in FIG. 3, has a ring gear 4 which has its inner cylindrical wall formed into an internal gear 2 which is engaged with planet gears 1, and its outer cylindrical wall formed into a helical spline gear 3. The ring gear 4 is inserted into the spigot joint 6 of the front frame 5 in such a manner that the helical spline gear 3 of the ring gear 4 is engaged with the helical spline gear formed in the inner cylindrical wall of the spigot joint of the front frame 5. An annular rubber member 7 is interposed between the ring gear 4 and an auxiliary plate 8, so as to elastically receive the axial thrust of the ring gear 4 which is moved forwardly (to the right in FIG. 3) along the helical spline gear by the reaction against the motion of the planet gears 1 inscribed in the ring gear 4.

In other words, in the conventional starter, the reaction force against the rotary motion of the planet gears 1 is elastically received by the annular rubber member 7 through the screw motion of the ring gear 4, and the impact which may occur in the power system thereof is smoothly received.

However, the conventional starter described above is disadvantageous in that it is rather difficult to manufacture the ring gear 4 by cold forging because it has the spur gear formed in the inner cylindrical wall and the helical spline gear formed in the outer cylindrical wall. The front frame having the helical spline gear formed in the spigot joint is generally made of die cast aluminum, and therefore, in the case where the helical spline gear is formed in the inner cylindrical wall of the front frame, the pattern drawing operation is rather difficult, and the resultant product is low in accuracy.

Accordingly, both the ring gear and the front frame must be formed by machining; that is, they cannot be produced on a large scale.

SUMMARY OF THE INVENTION

Accordingly, an object of the present invention is to eliminate the above described difficulty accompanying a conventional starter with a planet gear speed reducer.

More specifically, an object of the invention is to provide a starter with a planet gear speed reducer which has an impact stress receiving mechanism comprising components which can be manufactured on a large scale.

The foregoing object and other objects of the invention have been achieved by the provision of a starter with a planet gear speed reducer which, according to the invention, comprises: a ring gear having an internal gear formed in the inner cylindrical wall thereof with which a plurality of planet gears are engaged, and ratchet-shaped teeth formed on the outer cylindrical wall thereof in such a manner as to extend axially; a movable cylinder having teeth in the inner cylindrical wall thereof which are engaged with the ratchet-shaped teeth of the ring gear, and a straight spline gear formed in the outer cylindrical wall thereof which is engaged with a starter frame, the movable cylinder being axially slidably mounted on the ring gear; and an elastic member arranged adjacent to the movable cylinder along the axis thereof, the elastic member receiving, when impact stress produced in the power transmission mechanism of the starter is applied to the ring gear to rotate the latter, a force of moving the movable cylinder axially into which the resultant torque of the ring gear is converted through the ratchet shaped teeth.

With the starter having the planet gear speed reducer according to the invention, when impact stress generated in the power transmission system is applied to the ring gear, the latter is caused to rotate. However, it cannot be turned because the movable cylinder engaged through the axially extended ratchet-shaped teeth with the ring gear is further engaged with the starter frame through the straight spline gear formed in its outer cylindrical wall, so that the movable cylinder is moved through the ratchet-shaped teeth in the axial direction. This force of moving the movable cylinder in the axial direction is received by the elastic member which is arranged adjacent to the movable cylinder along the axis thereof.

The nature, principle and utility of the invention will become more apparent from the following detailed description when read in conjunction with the accompanying drawings.

DETAILED DESCRIPTION OF THE INVENTION

One example of a starter with a planet gear speed reducer according to this invention will be described with reference to FIG. 1.

Figure 1:
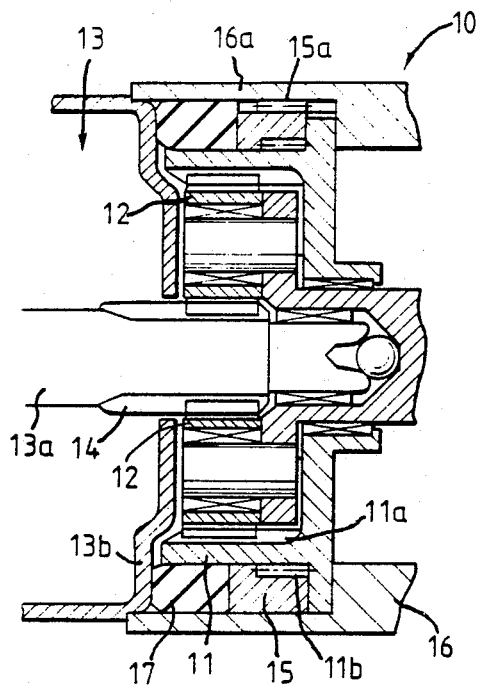
FIG. 1 is a sectional view showing part of one example of a starter with a planet gear speed reducer according to the invention.
Figure 3:
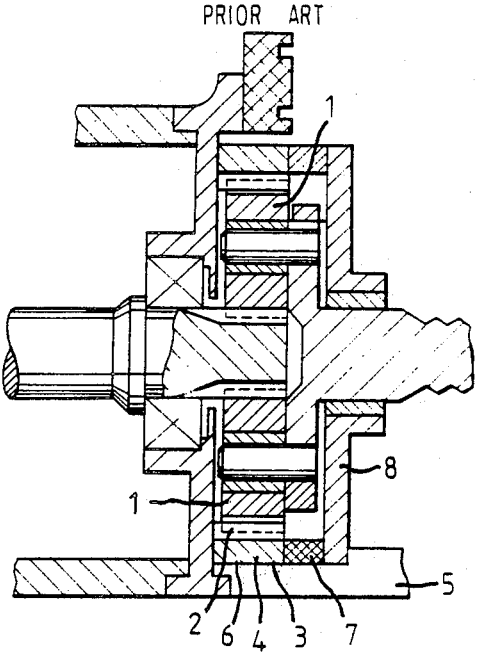
FIG. 3 is a sectional view showing part of a conventional starter with a planet gear speed reducer.
Figure 2:
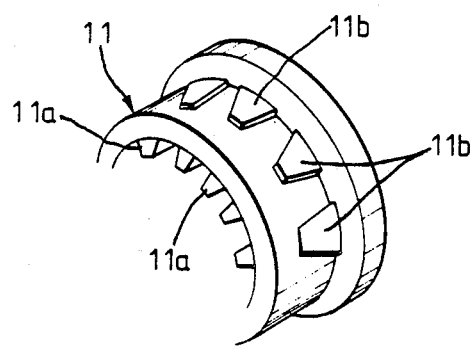
FIG. 2 is a perspective view showing part of a ring gear in the planet gear speed reducer shown in FIG. 1.

As shown in FIG. 1, the planet gear speed reducer of the starter 10 has a ring gear 11 in the inner cylindrical wall of which an internal gear 11a is formed. A plurality of planet gears 12 are inscribed in the internal gear 11a of the ring gear 11, and engaged with a sun gear 14 which is formed on the end portion of the rotary shaft 13a of the armature in an electric motor 13 and positioned at the center of revolution. A number of axially extended ratchet-shaped teeth 11b are formed in the outer cylindrical wall of the ring gear 11. The term "axially extended ratchet-shaped teeth" as used herein is intended to mean the teeth which, as shown in FIG. 2, are arranged in a circle and tapered in one direction in such a manner that each tooth has two sides forming an angle with the central axis of the ring gear 11 as viewed from above. A movable cylinder 15 is fitted on the ring gear 11 in such a manner that it is axially slidable. Ratchet-shaped teeth (not shown) are formed in the inner cylindrical wall of the movable cylinder 15 so that they are engageable with the ratchet-shaped teeth 11b of the ring gear 11. Thus, the ring gear 11 and the movable cylinder 15 are engaged with each other through the ratchet-shaped teeth.

A straight spline gear 15a is formed in the outer cylindrical wall of the movable cylinder 15, and is engaged with the straight spline gear (not shown) formed in the inner cylindrical wall of the spigot joint of the front frame 16 of the starter.

An elastic member 17, or a rubber ring, is interposed between the movable cylinder 15 and the bent portion 13b of the yoke of the motor 13 in such a manner that it is mounted on the ring gear 11.

The operation of the starter 10 with the planet gear speed reducer thus constructed will be described.

As the motor 13 is rotated (as the rotary shaft 13a of the armature is rotated), the planet gears 12 engaged with the sun gear 14 formed at the end portion of the rotary shaft 13a are revolved. In this operation, the ring gear 11 is caused to rotate by its reaction against the screw motion of the planet gears 12 inscribed in the internal gear 11a of the ring gear 11. However, the torque of the ring gear 11 is converted into a force which moves the movable cylinder 15 in an axial direction through the ratchet-shaped teeth 11b, and the force of moving the movable cylinder 15 axially is received by the elastic member 17. Thus, the impact which is generated in the power transmission system when a heavy load is applied to the speed reducer, especially when the starter is started, is similarly converted into the force of moving the movable cylinder 15 axially, which is absorbed by the elastic member 17.

Thus, in the starter according to the invention, the reaction against the rotation of the planet gears 12 is converted into the force of moving the movable cylinder 15 axially by means of the ratchet-shaped teeth 11b formed on the ring gear 11, which is elastically received by the elastic member 17. Therefore, the impact generated in the power transmission system of the starter is smoothly absorbed.

In the above-described embodiment, the elastic member 17 is the rubber ring. However, the same effect can be obtained by employing a disc spring or coiled spring instead of the rubber ring.

Effects of the Invention

As was described above, in the starter with the planet gear speed reducer according to the invention, the ring gear and the movable cylinder forming the means for receiving the impact stress produced in the power transmission mechanism have the ratchet-shaped teeth and the straight spline gear which can be formed by drawing, and therefore they can be manufactured by cold forging. In addition, the movable cylinder engaging means formed in the inner cylindrical wall of the front frame is the straight spline gear which mates with the straight spline gear of the movable cylinder, and therefore it can be formed by die casting. Thus, those components can be manufactured on a large scale with high accuracy, and accordingly provided at low cost.

What is claimed is:

1. A starter with a planet gear speed reducer which comprises:

a ring gear having an internal gear formed in an inner cylindrical wall thereof with which a plurality of planet gears are engaged, and ratchet-shaped teeth formed on an outer cylindrical wall thereof in such a manner as to extend axially;

a movable cylinder having teeth in an inner cylindrical wall thereof which are engaged with said ratchet-shaped teeth of said ring gear, and a straight spline gear formed in an outer cylindrical wall thereof which is engaged with a starter frame, said movable cylinder being axially movably mounted on said ring gear; and an elastic member arranged adjacent to said movable cylinder along the axis thereof, said elastic member receiving, when impact stress produced in the power transmission mechanism of said starter is applied to said ring gear to rotate said ring gear, a force of moving said movable cylinder axially into which resultant torque of said ring gear is converted through said ratchet-shaped teeth.

2. A starter according to claim 1, wherein said ratchet-shaped teeth are arranged in a circle and tapered in one direction in such a manner that each tooth has two sides forming an angle with the central axis of said ring gear.

3. A starter according to claim 1, wherein said elastic member comprises a rubber ring.

4. A starter according to claim 1, wherein said elastic member comprises a disk spring.

5. A starter according to claim 1, wherein said elastic member comprises a coiled spring.

* * * * *